United States Patent
Charpentier (10) Patent No.: US 12,465,019 B2
(45) Date of Patent: Nov. 11, 2025

(54) DOG TRAINING PLACE HOLDER SYSTEM AND METHOD

(71) Applicant: Alisa Charpentier, Houma, LA (US)

(72) Inventor: Alisa Charpentier, Houma, LA (US)

( * ) Notice: Subject to any disclaimer, the term of this patent is extended or adjusted under 35 U.S.C. 154(b) by 0 days.

(21) Appl. No.: 17/508,511

(22) Filed: Oct. 22, 2021

(65) Prior Publication Data
US 2023/0127114 A1    Apr. 27, 2023

(51) Int. Cl.
*A01K 15/02*    (2006.01)
*A01K 1/035*    (2006.01)
*A01K 13/00*    (2006.01)

(52) U.S. Cl.
CPC .......... *A01K 13/006* (2013.01); *A01K 1/0353* (2013.01); *A01K 15/02* (2013.01)

(58) Field of Classification Search
CPC .... A01K 13/006; A01K 1/0353; A01K 15/02; A01K 1/0263; A01K 27/002; A01K 27/008
USPC ........................................................ 119/850
See application file for complete search history.

(56) References Cited

U.S. PATENT DOCUMENTS

| | | | |
|---|---|---|---|
| 1,595,834 A | 8/1926 | Griffiths | |
| 4,671,049 A | 6/1987 | Benckhuijsen | |
| 6,637,367 B1 | 10/2003 | Dost et al. | |
| 6,708,650 B1 * | 3/2004 | Yates | A01K 27/002 |
| | | | 119/818 |
| 7,017,206 B1 | 3/2006 | Kedineoglu | |
| 7,121,231 B2 | 10/2006 | Benefiel | |
| 7,275,502 B2 | 10/2007 | Boyd et al. | |
| 8,950,364 B1 * | 2/2015 | Wamsat | A01K 27/002 |
| | | | 119/856 |
| 9,374,983 B1 * | 6/2016 | Kuehr | A01K 13/006 |
| 2005/0000470 A1 * | 1/2005 | Fountoulakis | A01K 27/005 |
| | | | 119/769 |
| 2006/0090711 A1 | 5/2006 | Richards | |
| 2007/0125312 A1 * | 6/2007 | Boyd | A01K 15/023 |
| | | | 119/721 |
| 2007/0272170 A1 | 11/2007 | Milson et al. | |
| 2010/0206247 A1 * | 8/2010 | Cheng | A01K 13/006 |
| | | | 119/850 |

(Continued)

FOREIGN PATENT DOCUMENTS

| | | | | |
|---|---|---|---|---|
| ES | 1279639 U | * | 10/2021 | ............. A01K 1/015 |
| WO | WO-2005060737 A1 | * | 7/2005 | ........... A01K 13/006 |

OTHER PUBLICATIONS

Non-stop dogwear _"10 Steps Teaching Your Dog How to Lie in a Sleeping Bag" (Year: 2021).*
ES-1279639-U_MACHINE_TRANSLATION.*

*Primary Examiner* — Peter M Poon
*Assistant Examiner* — Sahar Almatrahi
(74) *Attorney, Agent, or Firm* — KEATY LAW FIRM LLC; Thomas S. Keaty (57) ABSTRACT

A dog training place holder system and method providing a place-holder unit form as a planar mat of a colored single-ply waterproof fabric with a low-profile binding, grommets, and a leash opening, and a carabiner. The mat is used both as a covering for the dog, when the grommets are joined using the carabiner, and as a flat mat for the dog to sit or lie down, especially in unfamiliar environments or circumstances. A carry pouch can be provided for storing and carrying the mat, and a cinch strap can be used for securing the mat on the dog.

7 Claims, 6 Drawing Sheets

(56) References Cited

U.S. PATENT DOCUMENTS

| | | | |
|---|---|---|---|
| 2010/0277945 A1* | 11/2010 | Hurwitz | A01K 13/003 |
| | | | 362/570 |
| 2011/0174237 A1* | 7/2011 | Sanders-Luckman | ................... |
| | | | A01K 13/006 |
| | | | 119/856 |
| 2014/0338127 A1 | 11/2014 | Latime | |
| 2015/0296941 A1* | 10/2015 | Liu | A01K 1/0353 |
| | | | 190/115 |
| 2018/0116175 A1* | 5/2018 | Lui | A01K 27/001 |
| 2019/0373860 A1* | 12/2019 | Kath | A01K 13/006 |

* cited by examiner

DOG TRAINING PLACE HOLDER SYSTEM AND METHOD

BACKGROUND OF THE INVENTION

This invention provides a dog training place holder system and method.

Dogs kept as pets, companions, or service dogs are more comfortable in familiar environments and circumstances where the dog knows what kind of behavior is expected, and which precise locations are and are not acceptable for the dog to occupy. In unfamiliar environments and circumstances a dog is less likely to know what kind of behavior is expected, and less likely to know which precise locations are acceptable.

What is needed is a dog training place holder system and method providing an object that a dog can recognize as being associated with the dog, and which provides some reassurance to the dog and provides an indication to the dog of an appropriate precise location to sit and lie down. Presently known coverings for dogs do not provide such benefits.

U.S. Pat. No. 4,671,049 for a "Protective Blanket for Hoofed and Domestic Animals, In Particular Horses and Dogs," issued on Jun. 9, 2004 to assignee Temova Etablisement, provides for a protective blanket for hoofed and domestic animals, in particular horses and dogs, to protect against the influences of cold in cold weather or due to evaporation of the skin moisture after physical exertion, and for thermal treatment of certain ailments, e.g., influenza or kidney trouble. Woolen or linen blankets have the disadvantage of not giving off the evaporation moisture and do not provide warmth when wet. The protective blanket according to this invention provides better heat protection and has a therapeutic effect due to the fact that it consists of two mutually movable layers of a knit fabric made of nonhygroscopic synthetic fibers fit for generating static electricity and with a mesh of 50-125/cm2. For choice, the blanket contains a synthetic foam lining permeable to air between the two layers of fabric. The drawing shows the outside of a horse blanket with a neck rim at the head end and a rear rim with a loop to accommodate the tail. The cutout at the neck rim produces two blanket ends to fit around the breast.

U.S. Pat. No. 7,017,206 for a "Bag and Towel Combination," issued on Mar. 28, 2006 to inventor Nadia Kedineoglu, provides for a bag and towel combination including a bag assembly that includes a bottom wall and a peripheral wall that is attached to and extends upwardly from the bottom wall. The peripheral wall has an upper edge defining an opening extending into the bag assembly. The bottom wall has a generally rounded shape. The bag assembly has, a front side, a back side, and a pair of lateral sides. A flexible panel has a first edge, a second edge, a third edge, and a fourth edge. A coupling assembly includes a first mating portion and a second mating portion. The first mating portion is attached to the panel and is positioned generally adjacent to the first edge. The second mating portion is attached to an inner surface of the bag assembly. The first and second mating portions are removably coupled together.

U.S. Pat. No. 1,595,834 for "Animal Apparel," issued on Aug. 10, 1926 to inventor Roy A. Griffiths, provides for, among other things, a blanket provided with a neck piece, straps, and buckles. The body strap with its fastening means is of ordinary construction. At a point centrally of the blanket and just back of the neck piece, provided is a reinforcing piece sewed or otherwise suitably secured to the blanket and provided with an opening extending through the piece and the blanket through which may pass a ring of a harness.

US Publication No. 2006/0090711 for an "Animal Coat Harness," published on May 4, 2006 by inventor Ruth Richards, discloses an animal harness coat that includes a cover and a harness. The cover and harness are attached together. The cover allows the leash to be attached to the harness. The harness includes a front strap that extends entirely around the neck portion of the animal and a second strap that extends entirely around the body of the animal between the front legs and the hind quarters. As such, a force imparted on the harness through a leash is safely transmitted to the collarbone region and ribcage area of the animal.

US Publication No. 2014/0338127 for a "Blanket with Pet Pocket," published on Nov. 20, 2014 by inventor Lisa M. Latime, discloses a blanket with a pet pocket comprising a front and back surface large enough to cover a bed; a pocket on the front surface smaller than the front surface, wherein the pocket includes a top opening large enough for a household domestic pet to fit comfortably inside.

U.S. Pat. No. 7,121,231 for a "Doggie Blanket Coat," issued on Oct. 17, 2006 to inventor Tamara Lynn Benefiel, provides for a dog coat or blanket that includes a generally rectangular body section with chest and stomach straps extending from front and side edges respectively. The straps are adjustable so that a few sizes will fit most domesticate dog breeds. Both the body section and the straps are two ply construction and the straps both secure the coat to the dog and cover a substantial portion of either the chest or the stomach to limit heat loss. The dog coat can be mounted on a dog from above merely by draping the coat over the dog and attaching the chest and stomach straps.

U.S. Pat. No. 6,637,367 for a "Method and Apparatus for Easy Transport of an Animal Bed, of Particular Use for Dogs," issued on Oct. 28, 2003 to assignee Dost, Figg, Elliott, et al., LLC, provides for a method of carrying an animal bed that includes placing a harness on an animal, folding the bed, inserting the bed in and between center-facing pouches of a pack, and attaching the pack to the harness. An apparatus for carrying out the method is also described wherein the pack has a protective cover covering the openings of the center facing pouches, the cover having a body strap attached thereto.

US Publication No. 2007/0272170 for a "Therapeutic Pet Jacket and Bed," published on Nov. 29, 2007 by inventors Carl Dutrisac Milson et al., discloses a pet jacket and bed which possesses pockets therein for receiving removably insertable gel packs or grain (oatmeal) packs, which packs can be heated up or cooled as necessary so as to provide hot and cold therapies for convalescent arthritic pets or pets with injuries, or which can simply alter temperature and comfort for the pet.

SUMMARY OF THE INVENTION

This invention provides a dog training place holder system and method providing a place-holder unit of a colored single-ply waterproof fabric with a low-profile binding, grommets, and a leash opening, and a carabiner. The place-holder unit is used both as a covering for the dog, when placed on the dog with the carabiner connecting the grommets at the chest, and as a place holder which indicates to the dog an appropriate place to sit or lie down, especially in unfamiliar environments or circumstances. A carry pouch can also be provided for storing and carrying the place-holder unit. A cinch strap can also be provided for more secure placement of the place-holder unit as a covering for the dog.

The colored single-ply waterproof fabric is preferably colored either blue or yellow, being colors that dogs can see and distinguish, to provide visual information to help the dog identify the place-holder unit.

In use, especially during the process of training the dog or acclimating the dog to a new environment, the place-holder unit is used as a covering for the dog, during which time the place-holder unit might acquire some scent of the dog and will become familiar to the dog as an item associated with the dog and the dog's environment. Use as a covering might also provide protection for the dog or provide for identification of the dog, such as identification as a service dog, optionally with an attachable banner. At other times, such as when the dog is encountering a new environment or new circumstances, the place-holder unit can be placed at a location as an indicator to the dog of the appropriate location to sit or lie down, and as an item associated with and familiar to the dog.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
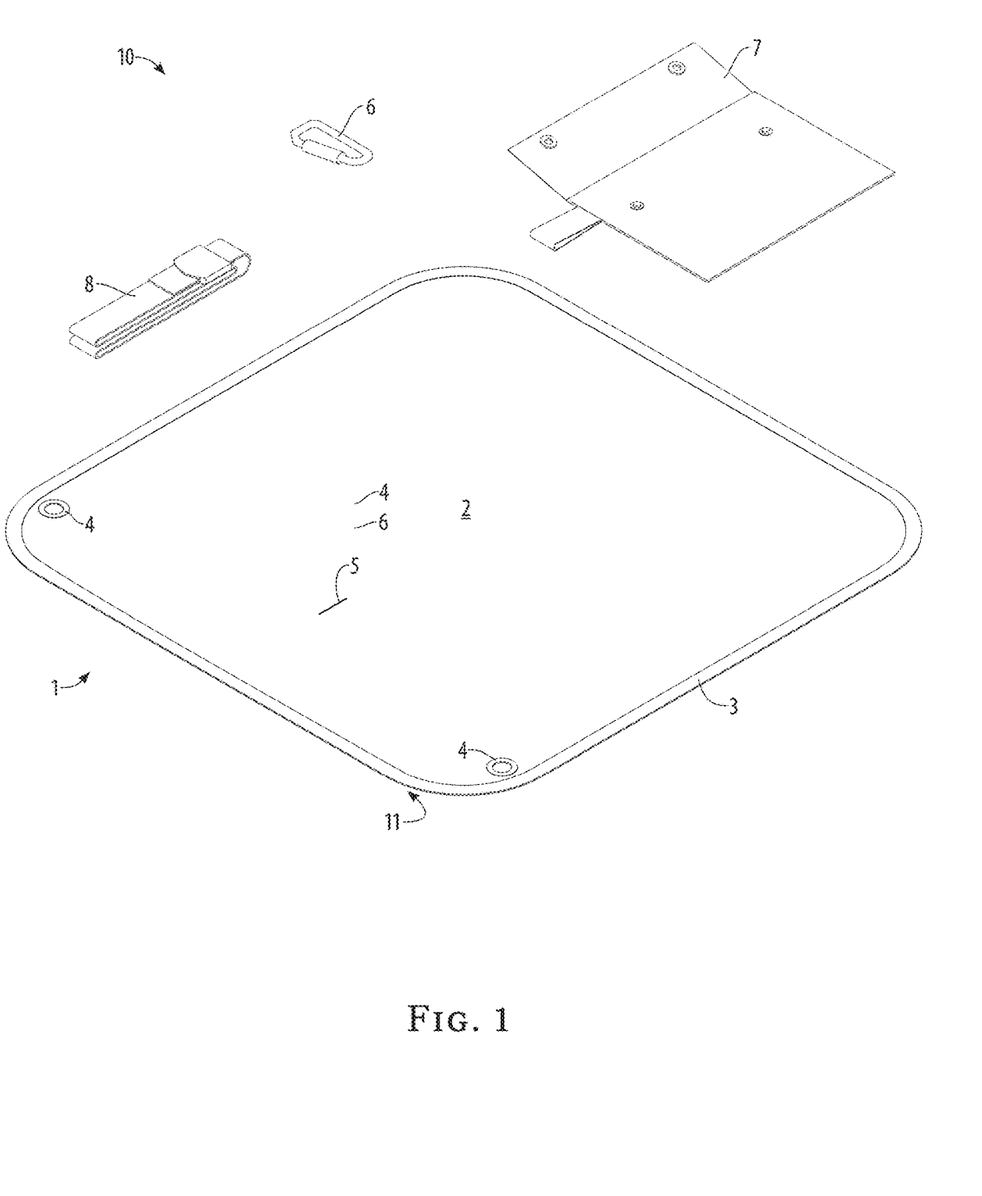
FIG. 1 is an axonometric overview of the dog training place holder system of the invention.
Figure 2:
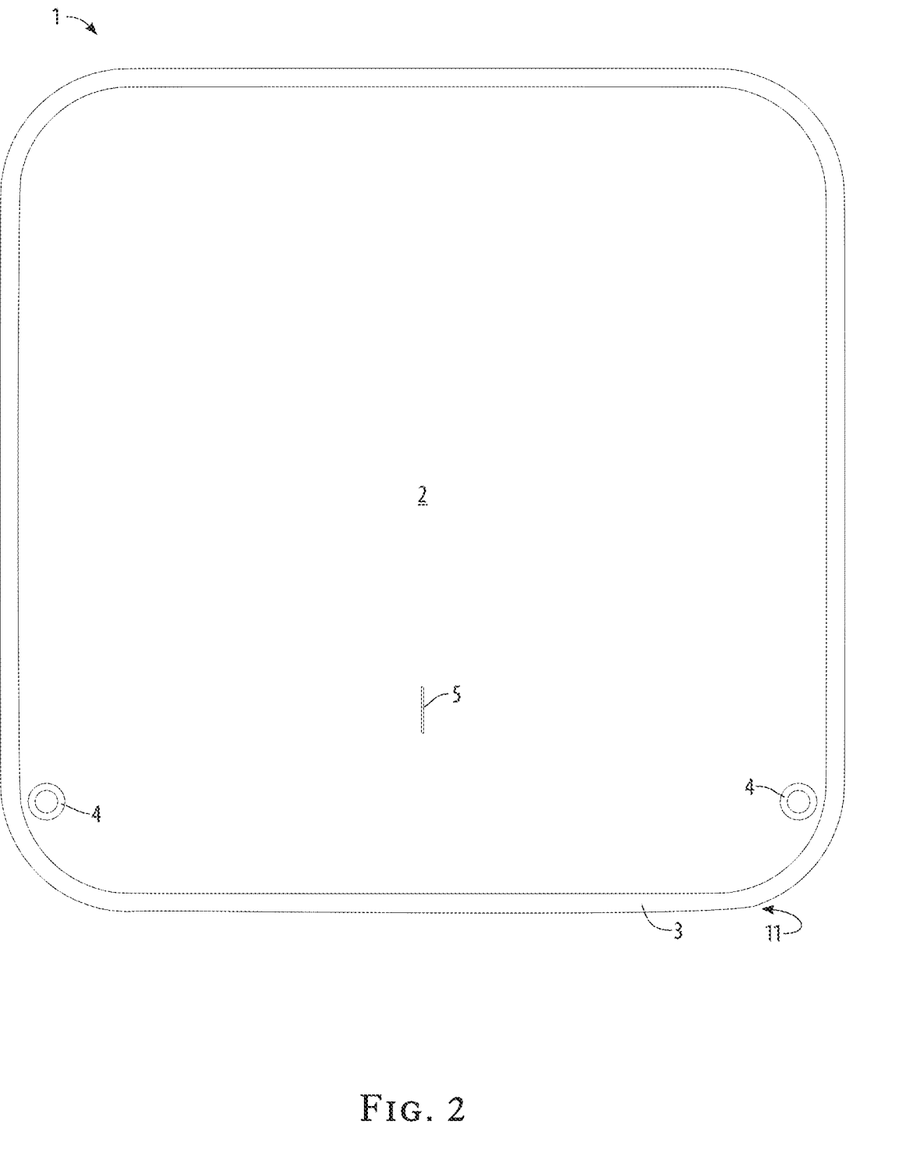
FIG. 2 is a plan view of the place-holder unit of the dog training place holder system of the invention.

Referring to FIG. 1, the dog training place holder system 10 provides a place-holder unit 1 providing a rectangular body 2 formed from a piece of colored single-ply waterproof fabric and having a low-profile binding 3, at least two grommets 4, and a leash opening 5, all as treated in detail below. The dog training place holder system 10 further provides a carabiner 6. In a preferred full embodiment, the dog training place holder system 10 also provides a carry pouch 7 and a cinch strap 8. As can be seen in FIGS. 1 and 2, the leash opening 5 is of a slit-shaped configuration and is formed at a distance inwardly from a front edge 11 of the rectangular body 2. The slit-shaped opening 5 has an elongated configuration and extends transversely to the front edge 11.

Referring to FIG. 2, the colored single-ply waterproof fabric 2 is colored either blue or yellow or both because those are colors dogs can see and distinguish. The place-holder unit 1 thereby provides visual information which helps the dog identify the place-holder unit 1 as being a thing associated with and familiar to the dog even when encountered in different or unfamiliar places or circumstances. The color information is in addition to other information such as smell and other visual information such as shape and texture.

The colored single-ply waterproof fabric 2 is intended to function as both a covering for the dog and as a place holder indicating a location where the dog is allowed and encouraged to sit or lie down. The waterproof quality provides protection to the dog from rain or wet ground, and provides protection to an underlying surface from any moisture or soil carried on the dog's coat or generated by the dog. Appropriate material for the colored single-ply waterproof fabric 2 includes cotton, nylon, or polyester canvas, with a waterproofing treatment, and woven or non-woven synthetic materials such as polypropylene.

The low-profile binding 3 surrounds and protects the edges of the colored single-ply waterproof fabric 2. The binding can be made a different color or a different shade from the colored single-ply waterproof fabric 2 in order to increase visual contrast as perceived by the dog, thereby increasing the visual distinctiveness. The binding is attached as a low-profile binding 3 to avoid a pronounced lip or edge which the dog might exploit by chewing. The low-profile binding 3 can be made of nylon, polypropylene, or similar material.

At least two grommets 4 are set into the place-holder unit 1 at locations such that the grommets 4 can be brought together at the chest of the dog such that an edge of the place-holder unit 1 encircles the dogs neck and the colored single-ply waterproof fabric 2 drapes over the dog's back, forming a covering. In use, the two grommets 4 brought together at the dog's chest are connected using the carabiner 6. Additional grommets 4 in excess of two can optionally be provided. Such additional grommets 4 might allow a tighter or looser fit or other variations in fitting the place-holder unit 1 to the dog, or might allow the manufacture of place-holder units 1 which could be fit to a variety of sizes of dogs. The grommets 4 can be made of metal or durable plastic, or can be formed by sewing with a durable thread or cord. The grommets 4 do not move in relation to the place-holder unit 1, and are therefore not distracting to the dog and are not susceptible to being chewed by the dog, as any straps or clasps would be.

Figure 3:
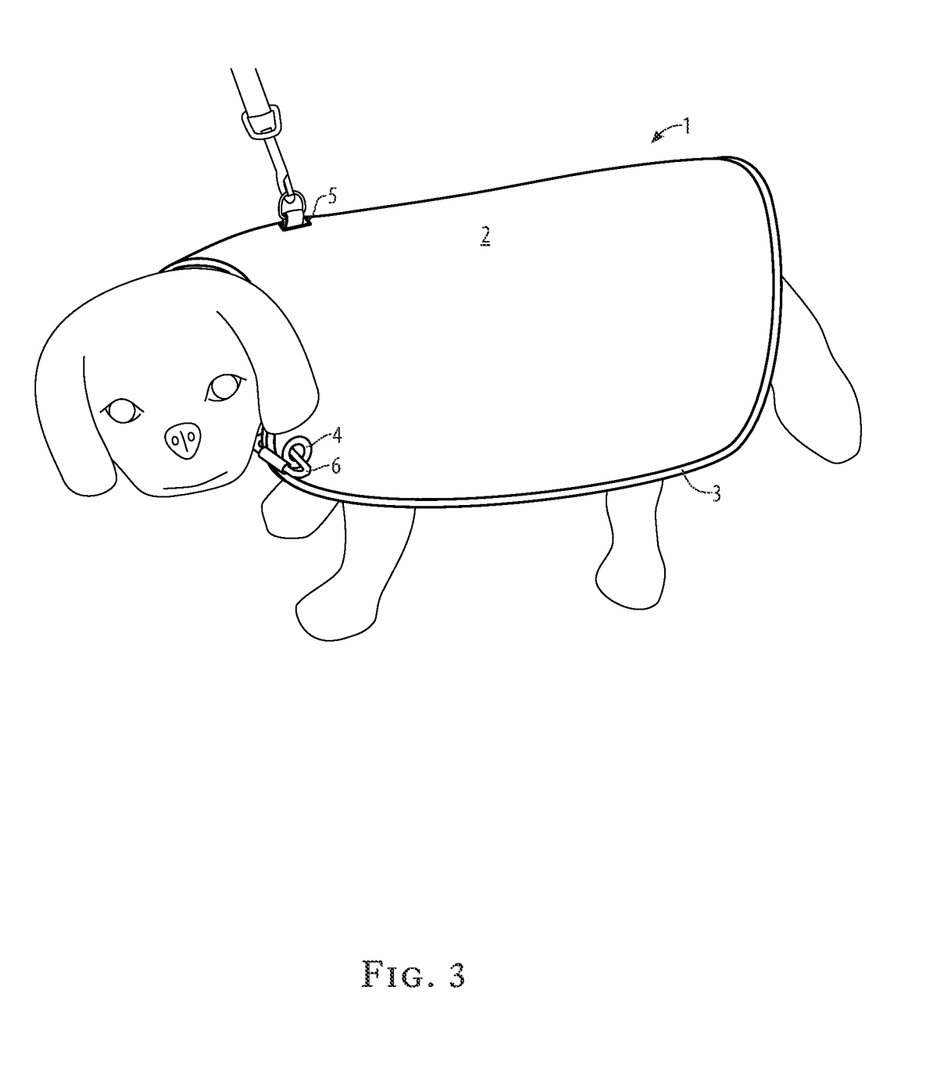
FIG. 3 is a perspective view of the dog training place holder system of the invention in use as a covering.

Referring to FIG. 3, the place-holder unit 1 provides a leash opening 5 allowing access to a collar or harness worn by the dog. The leash can be placed through the leash opening 5 to attach to a collar or harness inside the covering, or the attachment point of the collar or harness can be placed through the leash opening 5 with the leash attaching outside the covering. When the place-holder unit is used as a covering, the underside of the dog is not covered and consequently does not interfere with urination for male dogs.

In use in a first phase of the method of using the dog training place holder system 10, the place-holder unit 1 is placed upon the dog as a covering. The two grommets 4 are brought together at the dog's chest and are connected using the carabiner 6. While the place-holder unit 1 is used as a covering, it will acquire the scent of the dog and will become familiar to the dog as an object closely associated with the dog.

Figure 4:
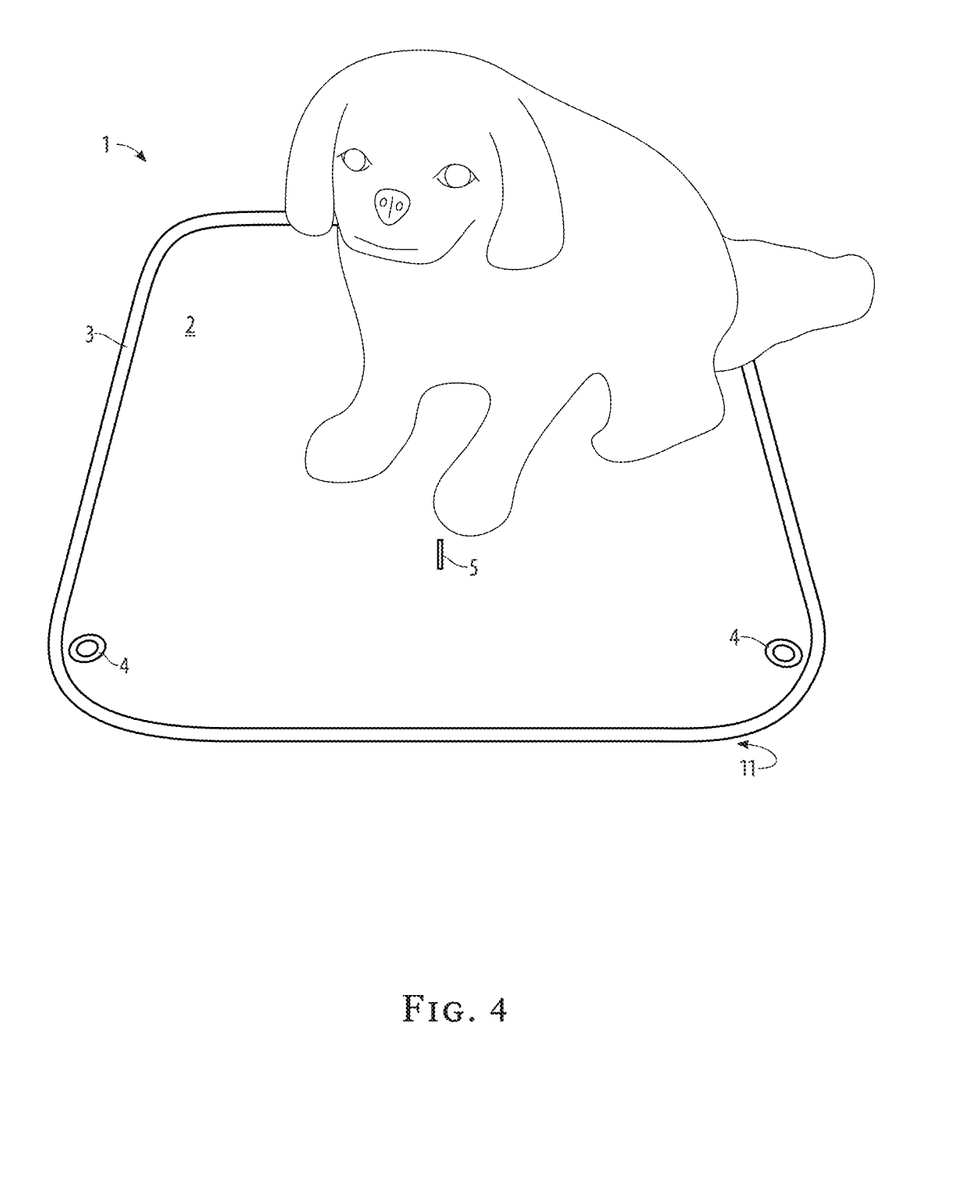
FIG. 4 is a perspective view of the dog training place holder system of the invention in use as a place holder.

Referring to FIG. 4, in use in a second phase of the method of using the dog training place holder system 10, the place-holder unit 1 is placed upon the ground or floor to delineate a place appropriate for the dog to sit or lie down, and to prevent the transfer of moisture or soil between the dog and the ground or floor. An exemplary scenario for such second-phase use is when a dog is brought into an unfamiliar indoor or outdoor place such as a veterinarian's office, another home or business, when traveling, or for an outdoor event or activity. The place-holder unit 1 is brought to the unfamiliar environment and is placed upon the floor or ground at the location which is determined to be appropriate for the dog. The dog's familiarity and association with the place-holder unit 1 signals to the dog that the location is the appropriate location to sit or lie down, and provides something familiar and comforting to the dog in an otherwise unfamiliar environment.

The dog training place holder system 10 can be especially beneficial when a dog is placed into an unfamiliar environment or encounters unfamiliar circumstances in the home environment. Because the dog has become familiar with and associated with the place-holder unit 1 through the first phase of the method, use of the place-holder unit 1 can be comforting and reassuring to the dog in two major ways. Wearing the place-holder unit 1 as a covering can be comforting and reassuring to the dog when the dog is brought into an unfamiliar place or when unfamiliar changes occur in the dog's home environment, such as when unfamiliar persons or animals or activities are brought into the home. Additionally, when the place-holder unit 1 is used as a location marker, the place-holder unit 1 can be comforting and reassuring to the dog as a clear indicator of where the dog is expected to sit or lie down.

The dog training place holder system is re-useable, and its method of use is based on long use during which a dog becomes familiar and comfortable with the place-holder unit.

Figure 5:
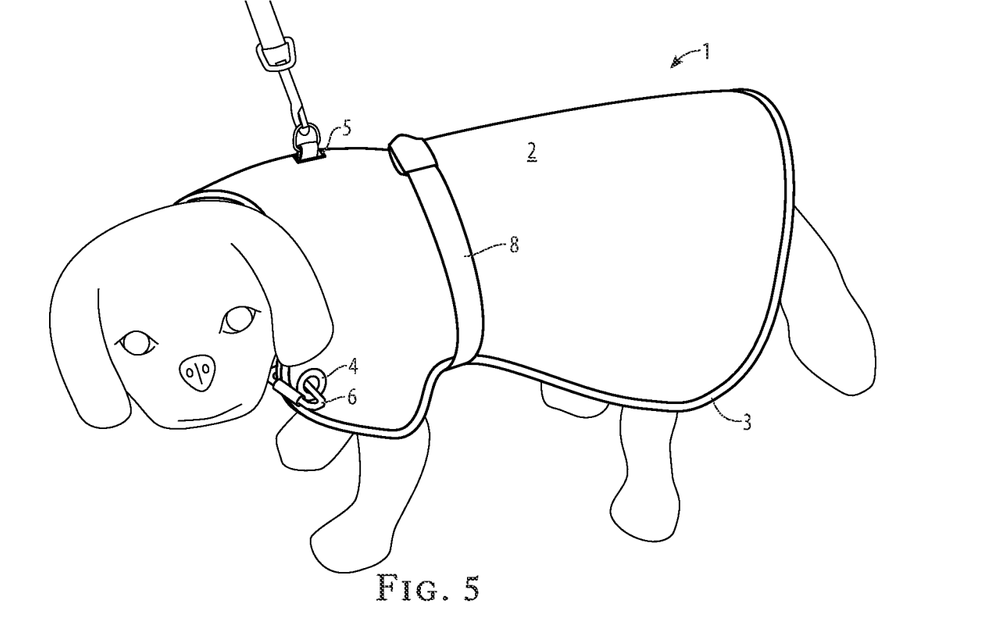
FIG. 5 is a perspective view of an embodiment of the dog training place holder system of the invention further providing a cinch strap.

Referring to FIG. 5, in an embodiment, the dog training place holder system 10 can also provide a cinch strap 8 to hold the place-holder unit 1 more closely to the dog.

Figure 6:
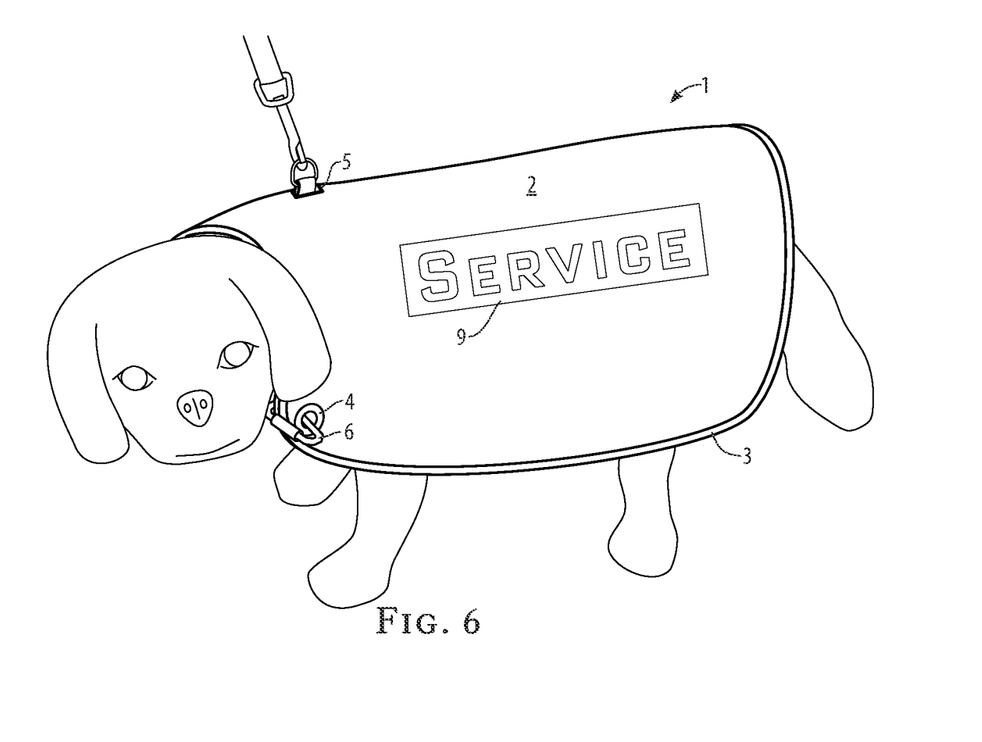
FIG. 6 is a perspective view of an embodiment of the dog training place holder system of the invention further providing an attachable banner.

Referring to FIG. 6, in an embodiment, the dog training place holder system 10 can also provide an attachable banner 9 for attachment to the colored single-ply waterproof fabric 2 of the place-holder unit 1. Such an attachable banner 9 might identify the dog as performing a certain function, and might be required in some circumstances. Attaching the attachable banner 9 to the place-holder unit 1 which is already familiar to the dog through training and use avoids problems which might arise from placing an unfamiliar covering on the dog.

Figure 7:
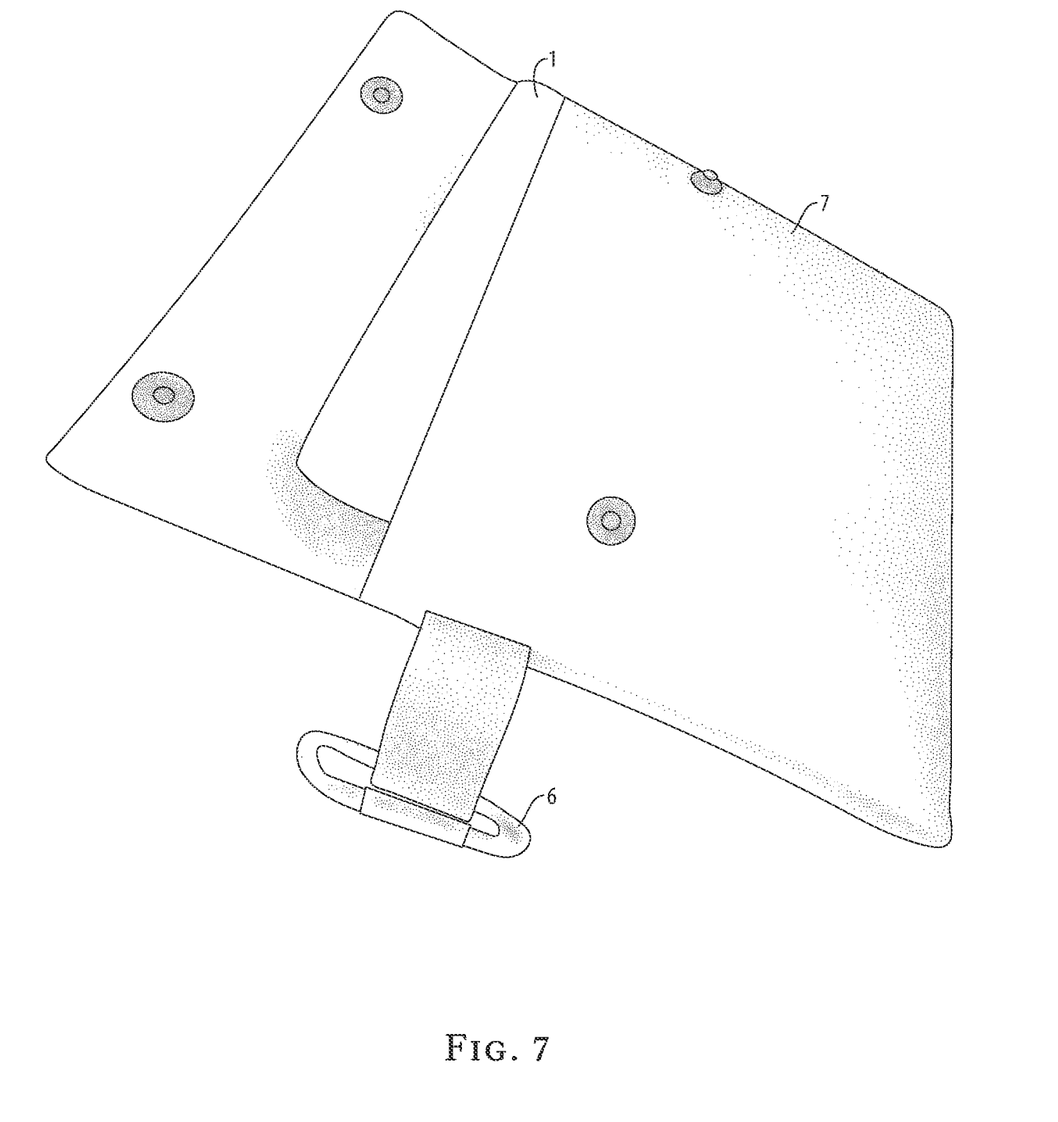
FIG. 7 is a perspective view of an embodiment of the dog training place holder system of the invention in use with the place-holder unit placed within the carry pouch.

Referring to FIG. 7, in a full preferred embodiment of the dog training place holder system 10 a carry pouch 7 is also provided. In use the place-holder unit 1 can be folded and placed into the carry pouch 7 for convenient transport to places where the place-holder unit 1 might be needed. The carabiner 6 can additionally be used for attachment of the carry pouch 7 to a leash or to another item or structure.

Many other changes and modifications can be made in the system and method of the present invention without departing from the spirit thereof. I therefore pray that my rights to the present invention be limited only by the scope of the appended claims.

I claim:

1. A dog training place holder method comprising the steps of:
   (i) providing a dog training place holder system comprising a substantially rectangular body having a planar configuration, a peripheral edge, a front edge, and opposing sides and formed from a sheet of colored single-ply waterproof fabric, a low-profile binding secured about the peripheral edge of the body, and at least two grommets formed adjacent opposing corners of the body, wherein said body has a slit-shaped elongated leash opening formed through the body a distance from the front edge of the body and extending transversely to the front edge of the body centrally between the opposing sides;
   (ii) providing a carabiner;
   (iii) connecting said grommets at a dog's chest using said carabiner; and
   (iv) training the dog by placing the place-holder unit onto the dog for a period of time to allow the scent of the dog to be on the place-holder unit and allow the dog to become familiar with the place-holder unit as the dog will recognize the place-holder unit to be associated with the dog and the dog's environment and (v) removing the place-holder unit from the dog and placing said place-holder unit at a location where the dog is expected to sit and lie down and training the dog to recognize the place-holder unit as the dog's place to sit and lie down.

2. The dog training place holder method of claim 1, comprising a step of providing a separate selectively positionable cinch strap and placing the cinch strap over said body when said body is placed in a covering position on the dog.

3. The dog training place holder method of claim 1, comprising a step of providing a carry pouch and transporting said place-holder unit in a folded form to the location.

4. The dog training place holder method of claim 1, comprising a step of providing a detachable banner and securing said banner to said place-holder unit upon demand.

5. The dog training place holder method of claim 1, comprising a step of providing a leash and attaching said leash to the dog's collar or harness through said leash opening.

6. The dog training place holder method of claim 3, comprising a step of securing said carabiner to said carry pouch upon demand.

7. The method of claim 1, wherein the leash opening is formed in a location equidistantly spaced from opposing parallel sides of the rectangular body and at a distance from the at least two grommets.

* * * * *